US012403727B2

United States Patent
Wada

(10) Patent No.: US 12,403,727 B2
(45) Date of Patent: Sep. 2, 2025

(54) PNEUMATIC TIRE

(71) Applicant: The Yokohama Rubber Co., LTD., Tokyo (JP)

(72) Inventor: Hironori Wada, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 617 days.

(21) Appl. No.: 17/754,007

(22) PCT Filed: Jul. 6, 2020

(86) PCT No.: PCT/JP2020/026442
§ 371 (c)(1),
(2) Date: Mar. 21, 2022

(87) PCT Pub. No.: WO2021/059662
PCT Pub. Date: Apr. 1, 2021

(65) Prior Publication Data
US 2022/0348040 A1   Nov. 3, 2022

(30) Foreign Application Priority Data
Sep. 25, 2019   (JP) ................................ 2019-174665

(51) Int. Cl.
*B60C 11/04*   (2006.01)
*B60C 11/13*   (2006.01)
*B60C 11/03*   (2006.01)

(52) U.S. Cl.
CPC ....... *B60C 11/04* (2013.01); *B60C 2011/0346* (2013.01); *B60C 2011/0381* (2013.01);
(Continued)

(58) Field of Classification Search
CPC ..... B60C 2011/0381; B60C 2011/0383; B60C 2011/0346; B60C 11/04; B60C 11/042; B60C 11/045; B60C 11/047
See application file for complete search history.

(56) References Cited

U.S. PATENT DOCUMENTS

2012/0325386 A1*  12/2012  Dautrey .............. B60C 11/0309
                                                                152/209.18
2016/0375728 A1   12/2016  Kuriyama
(Continued)

FOREIGN PATENT DOCUMENTS

DE   11 2014 005 382 T5   6/2023
EP       3 199 375 A1     8/2017
(Continued)

OTHER PUBLICATIONS

Machine Translation: JP-2012218652-A, Tamugi A, (Year: 2024).*
(Continued)

*Primary Examiner* — Kendra Ly
(74) *Attorney, Agent, or Firm* — Thorpe North & Western

(57) ABSTRACT

Provided is a pneumatic tire including: a plurality of main grooves each having a zigzag shape and extending in a tire circumferential direction; and a land portion defined by the main grooves adjacent to each other and having a rib structure that is continuous with the tire circumferential direction. The land portion includes first and second lug grooves having a semi-closed structure. A maximum length L21 of the first lug groove in a tire width direction has the relationship $1.30 \leq L21/L22 \leq 2.30$ with respect to a maximum length L22 of the second lug groove.

15 Claims, 13 Drawing Sheets

(52) U.S. Cl.
CPC ... *B60C 2011/0388* (2013.01); *B60C 2200/04* (2013.01); *B60C 2200/06* (2013.01)

(56) References Cited

U.S. PATENT DOCUMENTS

| | | | |
|---|---|---|---|
| 2017/0210176 A1* | 7/2017 | Ninomiya | B60C 11/0306 |
| 2019/0039418 A1 | 2/2019 | Arai | |
| 2019/0061430 A1* | 2/2019 | Kamigori | B60C 11/0304 |
| 2019/0351712 A1* | 11/2019 | Miyazaki | B60C 11/0304 |

FOREIGN PATENT DOCUMENTS

| | | | | |
|---|---|---|---|---|
| JP | 01204806 A | * | 8/1987 | |
| JP | 02114004 A | * | 4/1990 | |
| JP | 2001347811 A | * | 12/2001 | ......... B60C 11/0306 |
| JP | 2012218652 A | * | 11/2012 | |
| JP | 2013-063701 A | | 4/2013 | |
| JP | 2018-161944 A | | 10/2018 | |
| JP | 2019026204 A | * | 2/2019 | |

OTHER PUBLICATIONS

Machine Translation: JP-2019026204-A, Suzuki T, (Year: 2024).*
Machine Translation: JP-2001347811-A, Kuroki T, (Year: 2024).*
Machine Translation: JP01204806A, Tsuda, Toru, (Year: 2025).*
Machine Translation: JP-02114004-A, Takahashi O, (Year: 2025).*

* cited by examiner

| | CONVENTIONAL EXAMPLE | EXAMPLE 1 | EXAMPLE 2 | EXAMPLE 3 | EXAMPLE 4 |
|---|---|---|---|---|---|
| Main groove shape | Straight | Zigzag | Zigzag | Zigzag | Zigzag |
| $\lambda 2/\lambda 1$ | - | 1.00 | 1.00 | 1.00 | 1.00 |
| $Lg1/\lambda 1$ | - | 0.60 | 0.60 | 0.60 | 0.60 |
| $Lg2/\lambda 2$ | - | 0.60 | 0.60 | 0.60 | 0.60 |
| $A1/TW$ | - | 0.02 | 0.02 | 0.02 | 0.02 |
| $A2/TW$ | - | 0.02 | 0.02 | 0.02 | 0.02 |
| $L21/Wb2$ | 0.75 | 0.55 | 0.45 | 0.35 | 0.45 |
| $L22/Wb2$ | 0.75 | 0.25 | 0.25 | 0.25 | 0.20 |
| $L21/L22$ | 1.00 | 2.20 | 1.80 | 1.40 | 2.25 |
| $L31/Wb3$ | 0.25 | 0.25 | 0.25 | 0.25 | 0.25 |
| $L32/Wb3$ | 0.25 | 0.25 | 0.25 | 0.25 | 0.25 |
| $Wr/Wb3$ | -0.50 | -0.50 | -0.50 | -0.50 | -0.50 |
| $H21/Hg1$ | 0.65 | 0.65 | 0.65 | 0.65 | 0.65 |
| $H22/Hg1$ | 0.65 | 0.65 | 0.65 | 0.65 | 0.65 |
| $H22/H21$ | 1.00 | 1.00 | 1.00 | 1.00 | 1.00 |
| $H31/Hg2$ | 0.65 | 0.65 | 0.65 | 0.65 | 0.65 |
| $H32/Hg2$ | 0.65 | 0.65 | 0.65 | 0.65 | 0.65 |
| Snow traction performance | 100 | 115 | 113 | 111 | 112 |
| Uneven wear resistance performance | 100 | 110 | 112 | 113 | 113 |

FIG. 10A

| | EXAMPLE 5 | EXAMPLE 6 | EXAMPLE 7 | EXAMPLE 8 | EXAMPLE 9 | EXAMPLE 10 |
|---|---|---|---|---|---|---|
| Main groove shape | Zigzag | Zigzag | Zigzag | Zigzag | Zigzag | Zigzag |
| $\lambda 2/\lambda 1$ | 1.00 | 1.55 | 1.70 | 1.85 | 1.70 | 1.70 |
| Lg1/$\lambda$1 | 0.60 | 0.60 | 0.60 | 0.60 | 0.50 | 0.40 |
| Lg2/$\lambda$2 | 0.60 | 0.60 | 0.60 | 0.60 | 0.60 | 0.60 |
| A1/TW | 0.02 | 0.02 | 0.02 | 0.02 | 0.02 | 0.02 |
| A2/TW | 0.02 | 0.02 | 0.02 | 0.02 | 0.02 | 0.02 |
| L21/Wb2 | 0.45 | 0.45 | 0.45 | 0.45 | 0.45 | 0.45 |
| L22/Wb2 | 0.30 | 0.25 | 0.25 | 0.25 | 0.25 | 0.25 |
| L21/L22 | 1.50 | 1.80 | 1.80 | 1.80 | 1.80 | 1.80 |
| L31/Wb3 | 0.25 | 0.25 | 0.25 | 0.25 | 0.25 | 0.25 |
| L32/Wb3 | 0.25 | 0.25 | 0.25 | 0.25 | 0.25 | 0.25 |
| Wr/Wb3 | −0.50 | −0.50 | −0.50 | −0.50 | −0.50 | −0.50 |
| H21/Hg1 | 0.65 | 0.65 | 0.65 | 0.65 | 0.65 | 0.65 |
| H22/Hg1 | 0.65 | 0.65 | 0.65 | 0.65 | 0.65 | 0.65 |
| H22/H21 | 1.00 | 1.00 | 1.00 | 1.00 | 1.00 | 1.00 |
| H31/Hg2 | 0.65 | 0.65 | 0.65 | 0.65 | 0.65 | 0.65 |
| H32/Hg2 | 0.65 | 0.65 | 0.65 | 0.65 | 0.65 | 0.65 |
| Snow traction performance | 115 | 120 | 118 | 115 | 120 | 119 |
| Uneven wear resistance performance | 112 | 115 | 118 | 120 | 121 | 120 |

FIG. 10B

|  | EXAMPLE 11 | EXAMPLE 12 | EXAMPLE 13 | EXAMPLE 14 | EXAMPLE 15 | EXAMPLE 16 | EXAMPLE 17 |
|---|---|---|---|---|---|---|---|
| Main groove shape | Zigzag | Zigzag | Zigzag | Zigzag | Zigzag | Zigzag | Zigzag |
| A2/A1 | 1.70 | 1.70 | 1.70 | 1.70 | 1.70 | 1.70 | 1.70 |
| Lgl/Al | 0.50 | 0.50 | 0.50 | 0.50 | 0.50 | 0.50 | 0.50 |
| Lg2/A2 | 0.70 | 0.80 | 0.90 | 0.80 | 0.80 | 0.80 | 0.80 |
| Al/TW | 0.02 | 0.02 | 0.02 | 0.02 | 0.02 | 0.02 | 0.02 |
| A2/TW | 0.02 | 0.02 | 0.02 | 0.04 | 0.04 | 0.04 | 0.04 |
| L21/Wb2 | 0.45 | 0.45 | 0.45 | 0.45 | 0.45 | 0.45 | 0.45 |
| L22/Wb2 | 0.25 | 0.25 | 0.25 | 0.25 | 0.25 | 0.25 | 0.25 |
| L21/L22 | 1.80 | 1.80 | 1.80 | 1.80 | 1.80 | 1.80 | 1.80 |
| L3l/Wb3 | 0.25 | 0.25 | 0.25 | 0.25 | 0.50 | 0.60 | 0.60 |
| L32/Wb3 | 0.25 | 0.25 | 0.25 | 0.25 | 0 | 0.60 | 0.60 |
| Wr/Wb3 | -0.50 | -0.50 | -0.50 | -0.50 |  | 0.20 | 0.20 |
| H21/Hg1 | 0.65 | 0.65 | 0.65 | 0.65 | 0.65 | 0.65 | 0.65 |
| H22/Hg1 | 0.65 | 0.65 | 0.65 | 0.65 | 0.65 | 0.65 | 0.80 |
| H22/H21 | 1.00 | 1.00 | 1.00 | 1.00 | 1.00 | 1.00 | 1.23 |
| H31/Hg2 | 0.65 | 0.65 | 0.65 | 0.65 | 0.65 | 0.65 | 0.65 |
| H32/Hg2 | 0.65 | 0.65 | 0.65 | 0.65 | 0.65 | 0.65 | 0.65 |
| Snow traction performance | 125 | 124 | 126 | 128 | 130 | 133 | 135 |
| Wear resistance performance | 118 | 121 | 123 | 125 | 126 | 128 | 129 |

FIG. 11A

|  | EXAMPLE 18 | EXAMPLE 19 | EXAMPLE 20 | EXAMPLE 21 | EXAMPLE 22 | EXAMPLE 23 | EXAMPLE 24 |
|---|---|---|---|---|---|---|---|
| Main groove shape | Zigzag | Zigzag | Zigzag | Zigzag | Zigzag | Zigzag | Zigzag |
| A2/A1 | 1.70 | 1.70 | 1.70 | 1.70 | 1.70 | 1.70 | 1.70 |
| Lgl/Al | 0.50 | 0.50 | 0.50 | 0.50 | 0.50 | 0.50 | 0.50 |
| Lg2/A2 | 0.80 | 0.80 | 0.80 | 0.80 | 0.80 | 0.80 | 0.80 |
| Al/TW | 0.02 | 0.02 | 0.02 | 0.02 | 0.02 | 0.02 | 0.02 |
| A2/TW | 0.04 | 0.04 | 0.04 | 0.04 | 0.04 | 0.04 | 0.04 |
| L21/Wb2 | 0.45 | 0.45 | 0.45 | 0.45 | 0.45 | 0.45 | 0.45 |
| L22/Wb2 | 0.25 | 0.25 | 0.25 | 0.25 | 0.25 | 0.25 | 0.25 |
| L21/L22 | 1.80 | 1.80 | 1.80 | 1.80 | 1.80 | 1.80 | 1.80 |
| L3l/Wb3 | 0.60 | 0.60 | 0.60 | 0.60 | 0.60 | 0.60 | 0.60 |
| L32/Wb3 | 0.20 | 0.20 | 0.20 | 0.20 | 0.20 | 0.20 | 0.20 |
| Wr/Wb3 | 0.65 | 0.65 | 0.60 | 0.55 | 0.50 | 0.55 | 0.55 |
| H21/Hg1 | 0.85 | 0.90 | 0.80 | 0.80 | 0.80 | 0.80 | 0.80 |
| H22/Hg1 | 1.31 | 1.38 | 1.33 | 1.45 | 1.60 | 1.45 | 1.45 |
| H22/H21 | 0.65 | 0.65 | 0.65 | 0.65 | 0.65 | 0.85 | 0.95 |
| H31/Hg2 | 0.65 | 0.65 | 0.65 | 0.65 | 0.65 | 0.85 | 0.95 |
| H32/Hg2 |  |  |  |  |  |  |  |
| Snow traction performance | 136 | 137 | 139 | 137 | 135 | 140 | 141 |
| Wear resistance performance | 127 | 125 | 127 | 129 | 130 | 131 | 128 |

FIG. 11B

PNEUMATIC TIRE

TECHNICAL FIELD

The technology relates to a pneumatic tire and particularly relates to a pneumatic tire that can provide snow traction performance and uneven wear resistance performance of the tire in a compatible manner.

BACKGROUND ART

In a heavy duty tire that is mounted mainly on a drive shaft of a vehicle, the snow traction performance of the tire is enhanced by disposing semi-closed lug grooves in ribs while ensuring the uneven wear resistance performance of the tire based on a rib pattern.

The technology described in Japan Unexamined Patent Publication No. 2019-026204 is a pneumatic tire in the related art that employs such a structure.

SUMMARY

The technology provides a pneumatic tire that can provide both the snow traction performance and uneven wear resistance performance of the tire in a compatible manner.

The pneumatic tire according to an embodiment of the technology includes a plurality of main grooves having a zigzag shape and extending in a tire circumferential direction, and land portions defined by the main grooves adjacent to each other and having a rib structure continuous in the tire circumferential direction. The land portions include first and second lug grooves having a semi-closed structure, and a maximum length L21 of the first lug groove in a tire width direction has the relationship $1.30 \leq L21/L22 \leq 2.30$ with respect to a maximum length L22 of the second lug groove.

In a pneumatic tire according to an embodiment of the technology, the first and second lug grooves have maximum groove lengths L21, L22 that differ from each other, and thus, compared to a configuration in which the maximum groove lengths of the lug grooves are set to be uniform, there is an advantage that the uneven wear resistance performance and snow traction performance of the tire can be efficiently provided in a compatible manner.

BRIEF DESCRIPTION OF DRAWINGS

FIG. 10 is a table showing the results of performance tests of pneumatic tires according to embodiments of the technology.

FIG. 11 is a table indicating the results of performance tests of pneumatic tires according to embodiments of the technology.

DETAILED DESCRIPTION

Embodiments of the technology will be described in detail below with reference to the drawings. Note that embodiments of the technology are not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Pneumatic Tire

Figure 1:
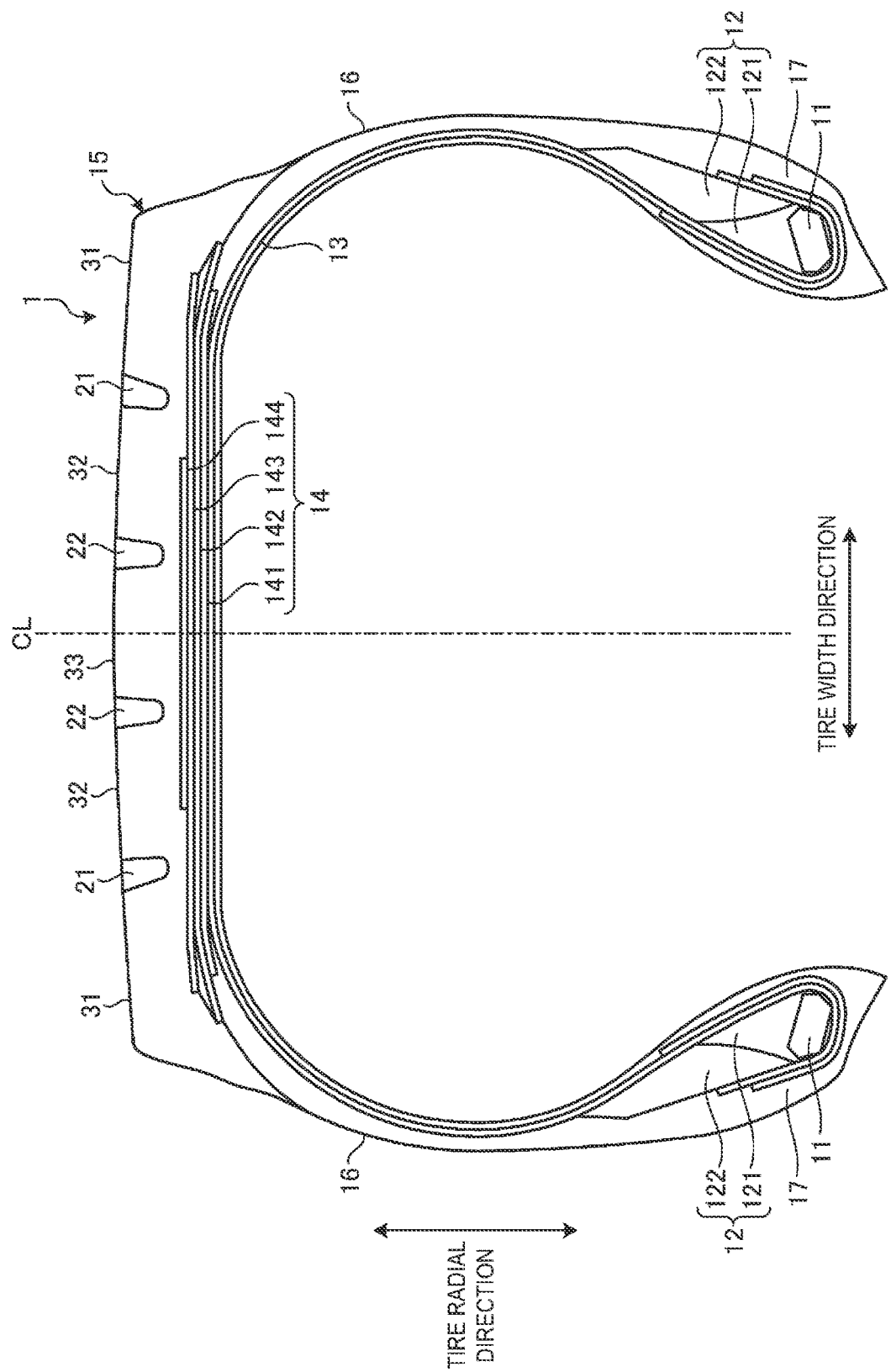
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in a tire radial direction. As an example of a pneumatic tire, the same drawing illustrates a heavy duty radial tire mounted on a drive shaft of a vehicle for long-distance transport such as a truck or a bus.

In the same drawing, a cross section in the tire meridian direction is defined as a cross section of the tire taken along a plane that includes a tire rotation axis (not illustrated). Further, a tire equatorial plane CL is defined as a plane perpendicular to the tire rotation axis through a midpoint between measurement points in a tire cross-sectional width defined by the Japan Automobile Tyre Manufacturers Association. Inc. (JATMA). Additionally, a tire width direction is defined as a direction parallel to the tire rotation axis, and the tire radial direction is defined as a direction perpendicular to the tire rotation axis.

A pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 each include one or more of bead wires made of steel and made by being wound annularly multiple times, and the pair of bead cores 11, 11 are embedded in bead portions and constitute cores of the bead portions on the left and right. The pair of bead fillers 12, 12 are each made of a lower filler 121 and an upper filler 122. The pair of bead fillers 12, 12 are disposed in outer circumferences in the tire radial direction of the pair of bead cores 11, 11, respectively, and reinforce the bead portions.

The carcass layer 13 includes a single layer structure made of one carcass ply, or a multilayer structure made of a plurality of carcass plies being layered, and the carcass layer 13 extends in a toroidal shape between the bead cores 11, 11 on the left and right, and constitutes the backbone of the tire. Additionally, both end portions of the carcass layer 13 are wound and turned back toward an outer side in the tire width direction to wrap the bead cores 11 and the bead fillers 12, and are fixed. The carcass ply of the carcass layer 13 is formed by covering, with coating rubber, a plurality of carcass cords made of steel and by performing a rolling process on the carcass cords and has a cord angle (defined as an inclination angle in a longitudinal direction of the carcass cord with respect to the tire circumferential direction) being 80° or more and 90° or less as an absolute value.

The belt layer 14 is made of a plurality of belt plies 141 to 144 being layered, and is disposed by being wound around an outer circumference of the carcass layer 13. The belt plies 141 to 144 include a large-angle belt 141, a pair of cross belts 142, 143, and a belt cover 144. The large-angle belt 141 is constituted by covering, with coating rubber, a plurality of belt cords made of steel and by performing a rolling process on the belt cords. The large-angle belt 141 has a cord angle (defined as an inclination angle in a longitudinal direction of the belt cords with respect to the tire circumferential direction) of 45 degrees or more and 70 degrees or less as an absolute value. The pair of cross belts 142, 143 are each constituted by covering, with coating rubber, a plurality of belt cords made of steel and by performing a rolling process on the belt cords. Each of the pair of cross belts 142, 143 has a cord angle of 10 degrees or more and 55 degrees or less as an absolute value. Additionally, the pair of cross belts 142, 143 have cord angles having mutually opposite signs, and the pair of cross belts 142, 143 are layered by making the belt cords mutually intersect in the longitudinal direction of the belt cords (a so-called crossply structure is formed). The belt cover 144 is constituted by covering, with coating rubber, a plurality of belt cover cords made of steel or an organic fiber material and by performing a rolling process on the belt cover cords. The belt cover 144 has a cord angle of 10 degrees or more and 55 degrees or less as an absolute value.

The tread rubber 15 is disposed in the outer circumferences in the tire radial direction of the carcass layer 13 and the belt layer 14 and constitutes a tread portion of the tire. The pair of sidewall rubbers 16, 16 are disposed on an outer side in the tire width direction of the carcass layer 13 and constitute sidewall portions on the left and right, respectively. The pair of rim cushion rubbers 17, 17 extend from an inner side in the tire radial direction of the bead cores 11, 11 on the left and right and turned back portions of the carcass layer 13 toward the outer side in the tire width direction, and constitute rim fitting surfaces of the bead portions.

Tread Surface

Figure 2:
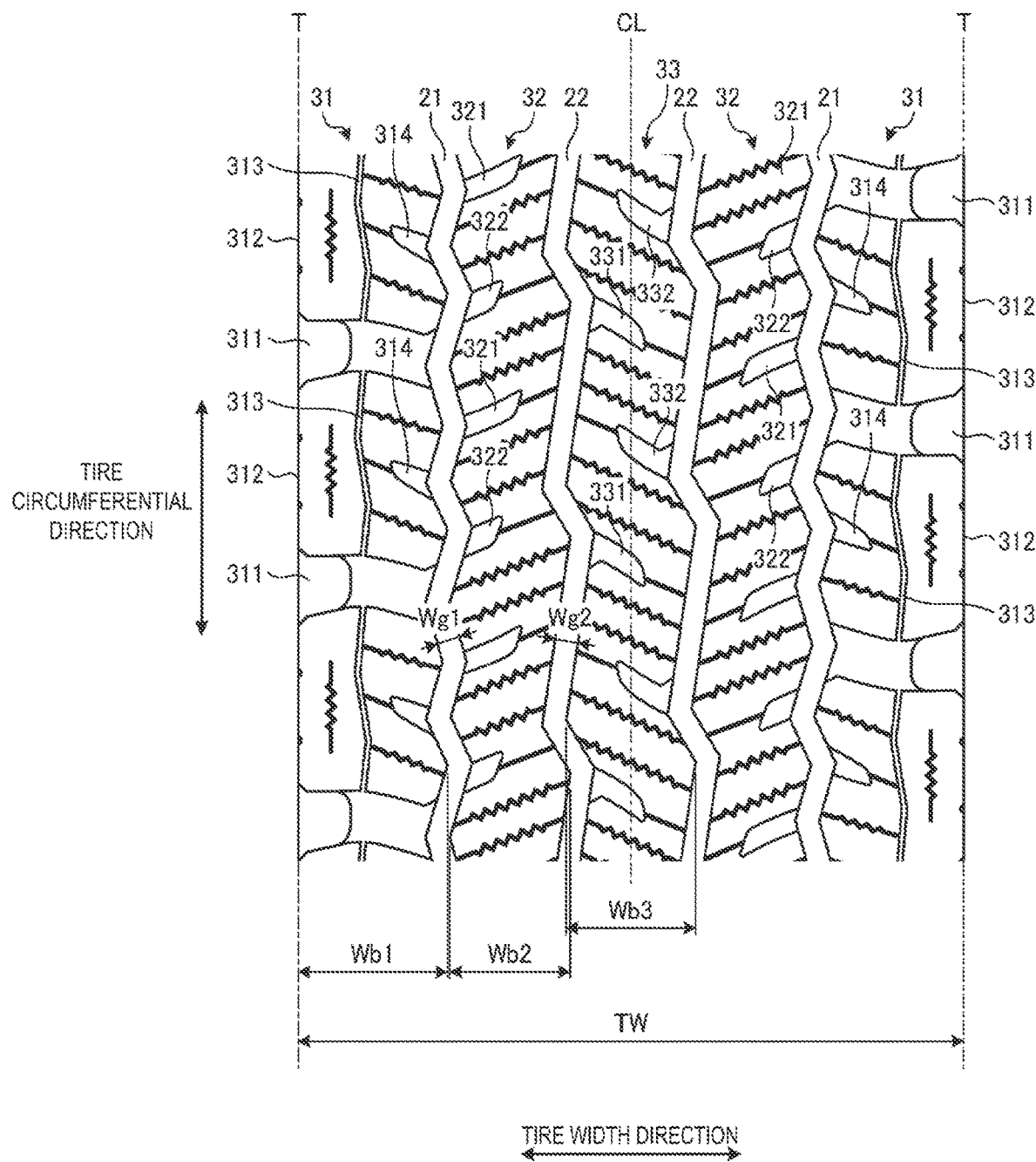
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread surface of an all-season tire. In the same drawing, "tire circumferential direction" refers to the direction about the tire rotation axis. Additionally, reference sign T denotes a tire ground contact edge, and dimension symbol TW denotes a tire ground contact width.

As illustrated in FIG. 2, the pneumatic tire 1 includes, in the tread surface, a plurality of main grooves 21, 22 extending in the tire circumferential direction and a plurality of land portions 31 to 33 defined by the main grooves 21, 22.

"Main groove" refers to a groove on which a wear indicator must be provided as specified by JATMA and has a groove width of 6.0 mm or more and a groove depth of 10 mm or more. Additionally, in the configuration of FIG. 2, groove widths Wg1, Wg2 of the main grooves 21, 22, respectively (see FIG. 2), are in the range of 3% or more and 4% or less with respect to a tire ground contact width TW.

The groove width is measured as a distance between groove walls opposed to each other in a groove opening portion when the tire is mounted on a specified rim, inflated to a specified internal pressure, and in an unloaded state. In a configuration in which the groove opening portion includes a notch portion or a chamfered portion, the groove width is measured with intersection points between an extension line of the tread contact surface and extension lines of the groove walls as measurement points, in a cross-sectional view parallel with the groove width direction and the groove depth direction.

The groove depth is measured as a distance from the tread contact surface to a groove bottom when the tire is mounted on a specified rim, inflated to a specified internal pressure, and in an unloaded state. Additionally, in a configuration in which the groove bottom partially includes a raised bottom portion, a sipe, or a recess/protrusion portion, the groove depth is measured excluding the raised bottom portion, the sipe, or the recess/protrusion portion.

"Specified rim" refers to a "standard rim" defined by JATMA, a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally. "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, in the case of a tire for a passenger vehicle, specified internal pressure is an air pressure of 180 kPa, and specified load is 88% of the maximum load capacity at the specified internal pressure.

For example, in the configuration of FIG. 2, four main grooves 21, 22 are disposed in a left-right symmetry about the tire equatorial plane CL. Five rows of land portions are defined by the main grooves 21, 22. In addition, one land portion 33 is disposed on the tire equatorial plane CL.

However, the configuration is not limited thereto, and three or five main grooves may be disposed (not illustrated). Additionally, a land portion may be disposed at a distance from the tire equatorial plane CL (not illustrated).

Additionally, of the main grooves 21, 22:21, 22 disposed in each of the regions being demarcated by the tire equatorial plane CL, the main grooves 21, 21 on outermost sides in the tire width direction are defined as shoulder main grooves, and the other main grooves 22, 22 are defined as center main grooves.

In the configuration of FIG. 2, a distance (dimension symbol omitted in drawings) from the tire equatorial plane CL to a groove center line of each of the shoulder main grooves 21, 21 of left and right is in the range of 26% or more and 32% or less of the tire ground contact width TW. A distance from the tire equatorial plane CL to a groove center line of each of the center main grooves, 22, 22 of left and right is in the range of 8% or more and 12% or less of the tire ground contact width TW.

The groove center line is defined as an imaginary line connecting midpoints of measurement points of a distance between groove walls opposed to each other.

The tire ground contact width TW is measured as a maximum linear distance in the tire axial direction of a contact surface of the tire and a flat plate when the tire is mounted on a specified rim, inflated to a specified internal pressure, placed perpendicular to the flat plate in a static state, and loaded with a load corresponding to a specified load.

A tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

The land portions 31, 31 located on the outer side in the tire width direction, the outer side being defined by the shoulder main grooves 21, 21, are defined as the shoulder land portions. The shoulder land portions 31, 31 are land portions on the outermost sides in the tire width direction and are located on the tire ground contact edges T. Additionally, the land portions 32, 32 located on an inner side in the tire width direction, the inner side being defined by the shoulder main groove 21, 21, are defined as the middle land portions. The middle land portions 32, 32 are each adjacent to the shoulder land portion 31 across the shoulder main groove 21. Furthermore, the land portion 33 located closer to a tire equatorial plane CL side than the middle land portions 32, 32 is defined as the center land portion. The center land portion 33 may be disposed on the tire equatorial plane CL (see FIG. 2) or may be arranged at a position away from the tire equatorial plane CL (not illustrated).

In a configuration including four main grooves 21, 22 as illustrated in FIG. 2, a pair of the shoulder land portions 31, 31, a pair of the middle land portions 32, 32, and a single center land portion 33 are defined. Additionally, for example, in a configuration including five or more main grooves, two or more rows of the center land portions are defined (not illustrated), and in a configuration including three main grooves, the middle land portion also serves as the center land portion (not illustrated).

In the configuration of FIG. 2, the shoulder land portion 31 is a block row defined by lug grooves 311 described below, and the middle land portion 32 and the center land portion 33 are ribs that are continuous in the tire circumferential direction.

In the configuration described above, the land portions 32, 33 in the tread portion center region are ribs continuous in the tire circumferential direction, and the rigidity of the land portions 32, 33 is ensured while the wear resistance performance and uneven wear resistance performance of the tire are ensured. The land portions 32, 33 in the tread portion center region include a pair of middle lug grooves 321, 322 and another pair of lug grooves 331, 332, the pairs of lug grooves having a semi-closed structure described below, and thus the snow traction performance of the tire is ensured.

In FIG. 2, maximum ground contact widths Wb1, Wb2, Wb3 of the land portions 31, 32, 33, respectively, are in the range of 15% or more and 25% or less with respect to the tire ground contact width TW. In the configuration of FIG. 2, the maximum ground contact width Wb2 of the middle land portion 32 is the smallest. The maximum ground contact width Wb3 of the center land portion 33 preferably has the relationship $1.00 \leq Wb3/Wb2 \leq 1.20$ with respect to the maximum ground contact width Wb2 of the middle land portion 32, and more preferably has the relationship $1.05 \leq Wb3/Wb2 \leq 1.10$.

The ground contact widths of the land portions are each measured as a linear distance in the tire axial direction in a contact surface of the land portion and a flat plate, when the tire is mounted on a specified rim, inflated to a specified internal pressure, placed perpendicular to the flat plate in a static state, and subjected to a load corresponding to a specified load.

Zigzag Shape of Main Groove

Figure 3:
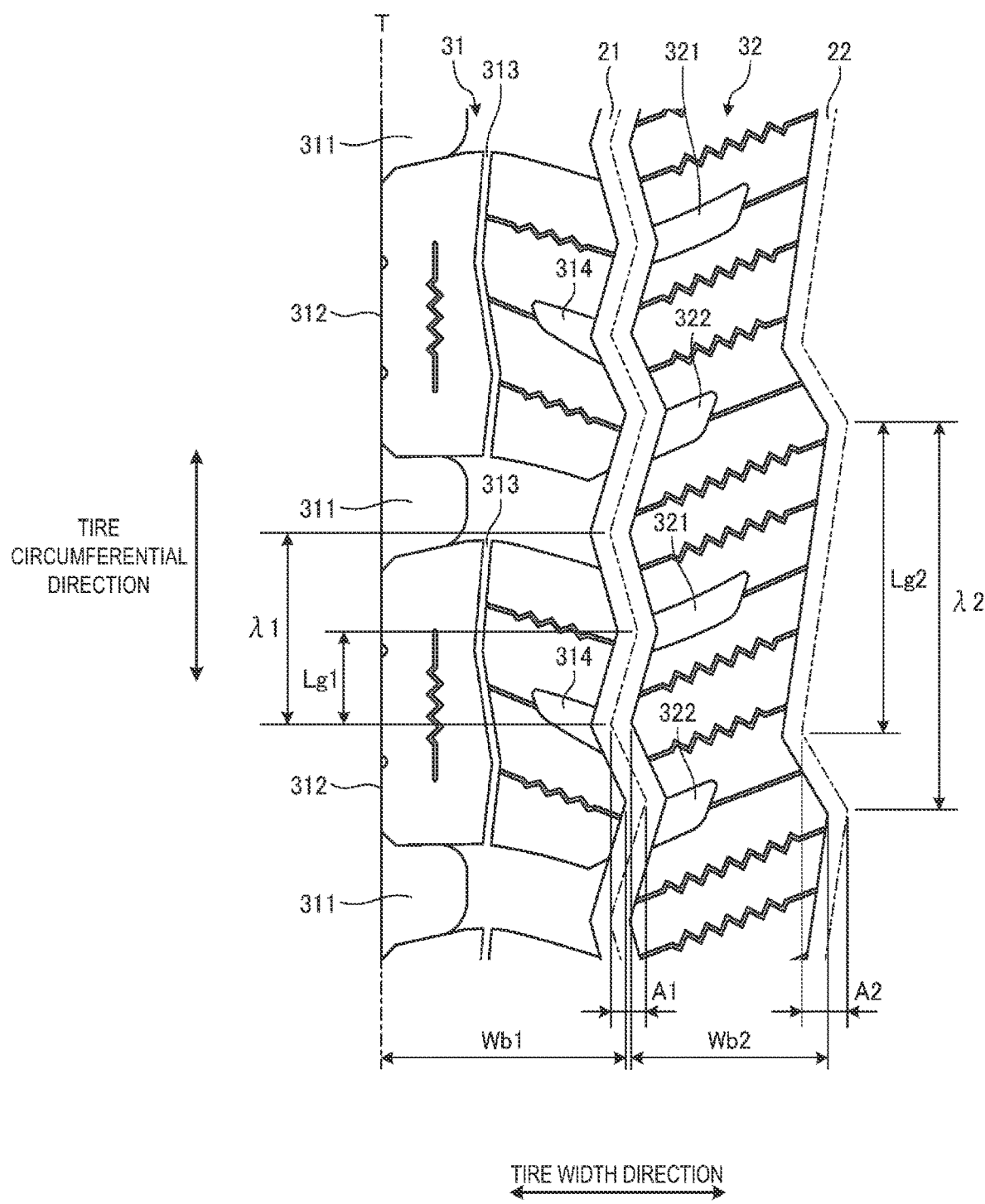
FIG. 3 is an enlarged view illustrating a shoulder land portion and a middle land portion of the pneumatic tire illustrated in FIG. 2.
Figure 4:
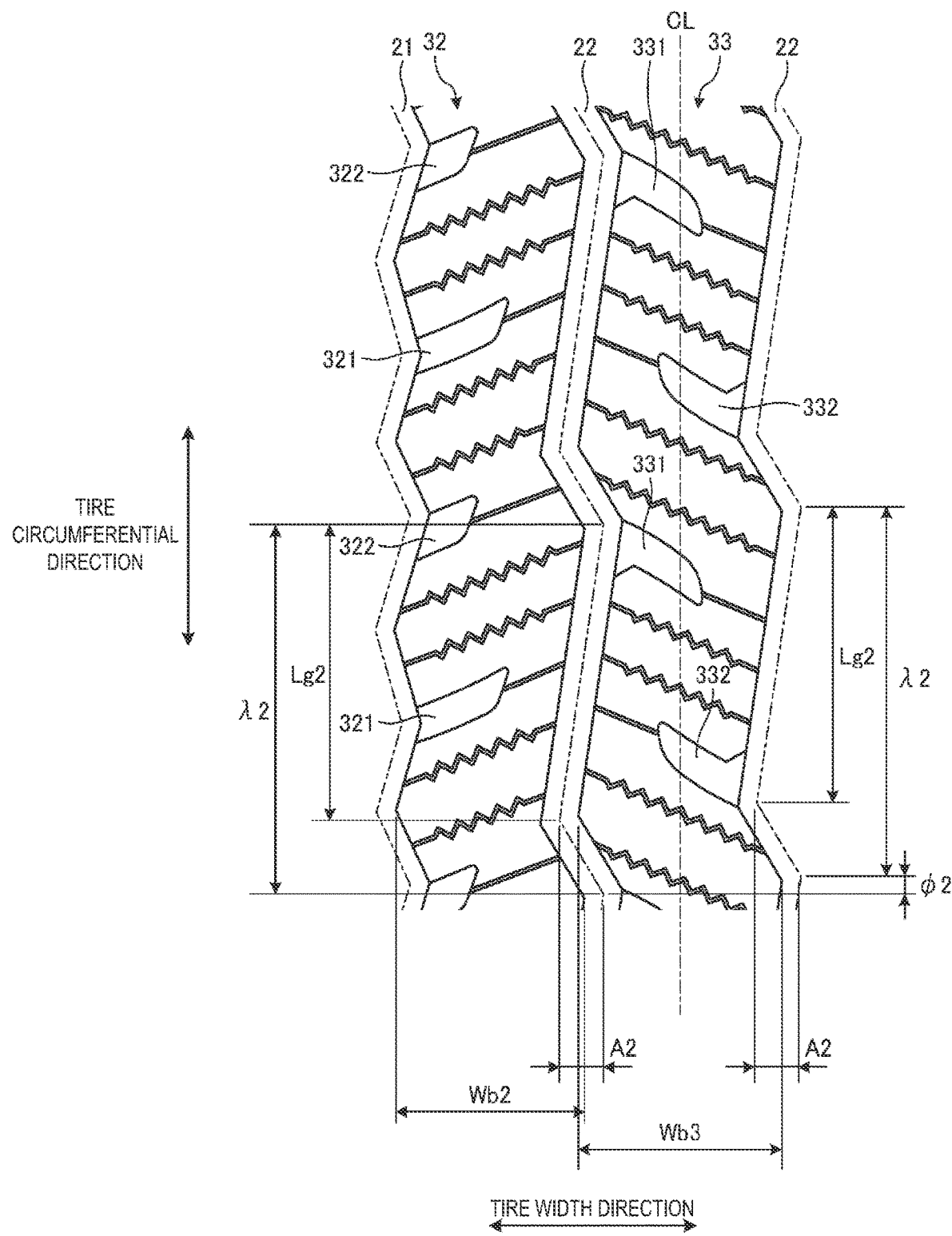
FIG. 4 is an enlarged view illustrating the middle land portion and a center land portion of the tire illustrated in FIG. 2.

FIG. 3 is an enlarged view illustrating the shoulder land portion 31 and the middle land portion 32 of the pneumatic tire illustrated in FIG. 2. FIG. 4 is an enlarged view illustrating the middle land portion 32 and the center land portion 33 of the pneumatic tire illustrated in FIG. 2. In the drawings, a dot-dash line in a zigzag shape indicates a groove center line of each of the main grooves 21, 22.

As illustrated in FIG. 2, the shoulder main groove 21 and the center main groove 22 have a zigzag shape having an amplitude in the tire width direction.

Additionally, the shoulder main groove 21 has a zigzag shape formed by alternately connecting linear portions inclined in mutually different directions with respect to the tire circumferential direction. In FIG. 3, a circumferential length Lg1 of the linear portion preferably has the relationship $0.30 \leq Lg1/\lambda 1 \leq 0.70$ with respect to a wavelength $\lambda 1$ having a zigzag shape, and more preferably has the relationship $0.35 \leq Lg1/\lambda 1 \leq 0.65$. Accordingly, the shoulder main groove 21 preferably has a zigzag shape formed by connecting linear portions having a substantially identical length. Additionally, an amplitude A1 of the zigzag shape of the shoulder main groove 21 has the relationship $0.03 \leq A1/TW \leq 0.05$ with respect to the tire ground contact width TW.

The center main groove 22 has a zigzag shape formed by alternately connecting long portions and short portions that are inclined in mutually different directions with respect to the tire circumferential direction. In FIG. 4, a circumferential length Lg2 of the long portion having a zigzag shape preferably has the relationship $0.70 \leq Lg2/\lambda 2 \leq 0.90$ with respect to a wavelength $\lambda 2$ having a zigzag shape, and more preferably has the relationship $0.75 \leq Lg2/\lambda 2 \leq 0.85$. Additionally, an amplitude A2 of the zigzag shape has the relationship $0.03 \leq A2/TW \leq 0.05$ with respect to the tire ground contact width TW.

In the configuration described above, at least one of the main grooves 22 defining the land portions 32, 33 have the zigzag shape formed by alternately connecting the long portions and the short portions. Thus, compared to a configuration in which both of the main grooves have a straight shape, the snow traction performance of the tire can be improved while the rigidity of the land portions 32, 33 is ensured. Further, compared to a configuration in which both of the main grooves have a zigzag shape formed by linear portions having an approximately identical length, the rigidity of the land portions 32, 33 is ensured and the uneven wear resistance performance of the tire is improved.

In FIG. 3, the wavelengths $\lambda 1$, $\lambda 2$ of the zigzag shapes in the shoulder main groove 21 and the center main groove 22, respectively, have the relationship $1.50 \leq \lambda 2/\lambda 1 \leq 2.00$. Additionally, within the same pitch, the wavelength $\lambda 2$ in the center main groove 22 is preferably an integer multiple of the wavelength $\lambda 1$ in the shoulder main groove 21. For example, in the configuration of FIG. 3, a ratio $\lambda 2/\lambda 1$ of the wavelengths $\lambda 1$, $\lambda 2$ within the same pitch is set to be twice.

In FIG. 4, the center main grooves 22, 22 adjacent to each other have an identical wavelength $\lambda 2$ and an identical amplitude A2. However, when a ratio of wavelengths $\lambda 2$ and a ratio of amplitudes A2 of both of the main grooves are within ±5%, the wavelengths and the amplitudes are considered to be identical. Additionally, a phase difference $\varphi 2$ in the zigzag shapes of the center main grooves 22, 22 adjacent to each other has the relationship $0 \leq \varphi 2/\lambda 2 \leq 0.10$ with respect to the wavelength $\lambda 2$ having the zigzag shape. Accordingly, the center main grooves 22, 22 adjacent to each other are disposed with their zigzag phases aligned.

In the configuration of FIG. 2, as described above, the shoulder main groove 21 has the zigzag shape formed by connecting the linear portions having the substantially identical length, and the center main groove 22 has the zigzag shape formed by alternately connecting the long portions and the short portions. In such a configuration, the traction characteristics of the shoulder region in the tread portion are improved, and the snow performance of the tire is effectively enhanced. On the other hand, the rigidity of an edge portion of the land portion 32 on the tire equatorial plane CL side is ensured, and the center wear of the land portion 32 is suppressed. Accordingly, the snow performance and uneven wear resistance performance of the tire are provided in a compatible manner.

However, no such limitation is intended, and both the shoulder main groove 21 and the center main groove 22 may have the zigzag shape formed by alternately connecting the long portions and the short portions (not illustrated). Specifically, in FIG. 2, the shoulder main groove 21 has an identical structure to the center main groove 22, and thus the edge portions of left and right of the middle land portion 32 may have an identical structure to the center land portion 33.

Also, in the configuration of FIG. 2, as described above, the shoulder main groove 21 having a shorter wavelength $\lambda 1$ ($<\lambda 2$) is disposed closer to a tire ground contact edge T side than the center main groove 22 having a longer wavelength $\lambda 2$. In such a configuration, the traction characteristics of the shoulder region in the tread portion are improved, and the snow performance of the tire is effectively enhanced. On the other hand, the center main groove 22 on the tire equatorial plane CL side has a zigzag shape having the longer wavelength $\lambda 2$, and thus the rigidity of the tread portion center region is ensured, and the uneven wear resistance performance of the tire is ensured. Thus, the snow performance and uneven wear resistance performance of the tire are preferably provided in a compatible manner.

However, no such limitation is intended, and the shoulder main groove 21 may have a zigzag shape having a longer wavelength than the center main groove 22 (not illustrated), and the shoulder main groove 21 and the center main groove 22 may have an identical wavelength and amplitude (not illustrated).

In the configuration of FIG. 2, as illustrated in FIG. 3, the zigzag shape of the shoulder main groove 21 has a see-through structure when viewed in the tire circumferential direction. Thus, an edge portion of the shoulder land portion 31 and an edge portion of the middle land portion 32 do not overlap each other when viewed in the tire circumferential direction. Accordingly, a groove volume of the shoulder main groove 21 is ensured and the drainage properties of the tire are enhanced.

On the other hand, as illustrated in FIG. 4, the zigzag shape of the center main groove 22 has a see-through-less structure when viewed in the tire circumferential direction. Thus, the edge portion of the middle land portion 32 and an edge portion of the center land portion 33 overlap each other when viewed in the tire circumferential direction. Thus, the traction characteristics of the tire are improved.

Shoulder Land Portion

Figure 5:
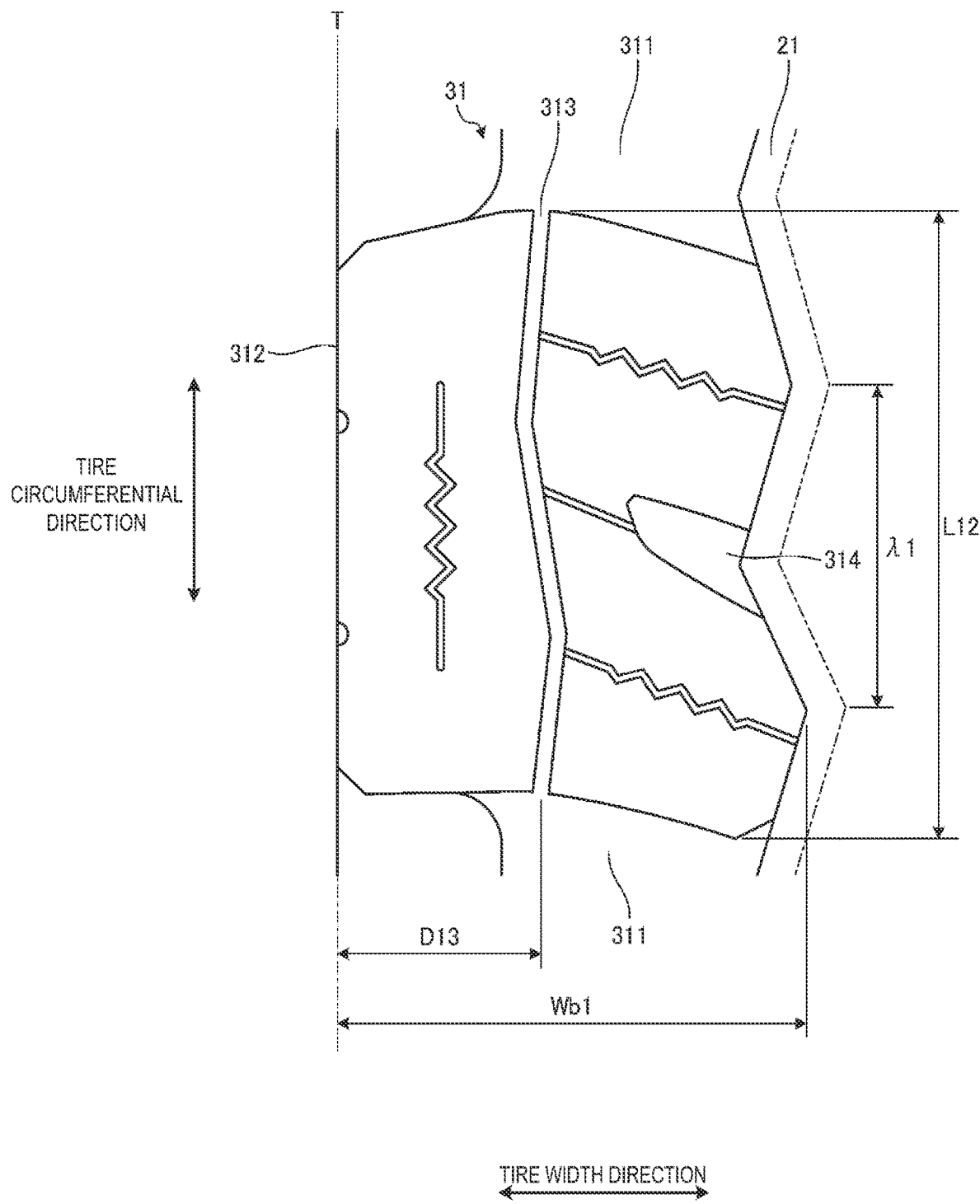
FIG. 5 is an enlarged view illustrating the shoulder land portion illustrated in FIG. 3.

FIG. 5 is an enlarged view illustrating the shoulder land portion 31 illustrated in FIG. 3. The same drawing illustrates a single shoulder block 312.

As illustrated in FIG. 2 and FIG. 3, the shoulder land portion 31 includes the shoulder lug grooves 311, the shoulder blocks 312, circumferential narrow grooves 313, and notch portions 314.

The shoulder lug groove 311 has a so-called open structure, extends through the shoulder land portion 31 in the tire width direction, and is open to the shoulder main groove 21 and the tire ground contact edge T. As illustrated in FIG. 5, the shoulder lug groove 311 is open to a maximum amplitude position, toward the tire ground contact edge T, of the zigzag shape of the shoulder main grooves 21. Additionally, a plurality of the shoulder lug grooves 311 are arrayed at a predetermined interval in the tire circumferential direction. A maximum groove width (dimension symbol omitted in drawings) of the shoulder lug groove 311 is in the range of 10 mm or more and 25 mm or less. A maximum groove depth (not illustrated) of the shoulder lug groove 311 is in the range of 30% or more and 80% or less with respect to a maximum groove depth of the shoulder main groove 21. Note that in the configuration of FIG. 5, the shoulder lug groove 311 is shallower than the shoulder main groove 21, and thus in a tread plan view, a boundary portion between the shoulder lug groove 311 and the shoulder main groove 21 appears as a ridge line.

The shoulder block 312 is formed by the shoulder land portion 31 being defined by the shoulder lug grooves 311 in the tire circumferential direction. Also, a single block row is formed. As illustrated in FIG. 5, an edge portion of the shoulder block 312 on a shoulder main groove 21 side has a zigzag shape along the shoulder main groove 21. Also, an edge portion of one shoulder block 312 includes two protrusion portions that project toward the shoulder main groove 21 and one recess portion that is recessed with respect to the shoulder main groove 21. Additionally, a maximum circumferential length L12 of the shoulder block 312 has the relationship $0.40 \leq \lambda 1/L12 \leq 0.70$ with respect to the wavelength $\lambda 1$ of the shoulder main groove 21, the wavelength $\lambda 1$ having the zigzag shape. The maximum circumferential length L12 of the shoulder block 312 has the relationship $1.10 \leq L12/Wb1 \leq 1.40$ with respect to the maximum ground contact width Wb1 of the shoulder land portion 31.

The circumferential narrow groove 313 extends through the shoulder block 312 in the tire circumferential direction and is open to the shoulder lug groove 311. As illustrated in FIG. 5, the circumferential narrow groove 313 has a zigzag shape, and an amplitude (dimension symbol omitted in drawings) of the circumferential narrow groove 313 is smaller than the amplitude A1 (see FIG. 3) of the shoulder main groove 21. Additionally, a maximum groove width (dimension symbol omitted in drawings) of the circumferential narrow groove 313 is in the range of 2% or more and 10% or less with respect to the maximum ground contact width Wb1 of the shoulder land portion 31. The maximum groove depth (not illustrated) of the circumferential narrow groove 313 is in the range of 30% or more and 80% or less with respect to the maximum groove depth of the shoulder main groove 21. A distance D13 from the tire ground contact edge T to the circumferential narrow groove 313 is in the range $0.30 \leq D13/Wb1 \leq 0.70$ with respect to the maximum ground contact width Wb1 of the shoulder land portion 31.

The notch portion 314 is formed in the edge portion of the shoulder block 312 on the shoulder main groove 21 side. The notch portion 314 is disposed separated from the circumferential narrow groove 313. The notch portion 314 is formed at the maximum amplitude position, toward the tire ground contact edge T, of the zigzag shape of the shoulder main groove 21. Moreover, a single notch portion 314 is formed in the shoulder block 312. An opening width (dimension symbol omitted in drawings) of the notch portion 314 with respect to the shoulder main groove 21 is in the range of 5.0 mm or more and 15 mm or less. A maximum depth (not illustrated) of the notch portion 314 is in the range of 30% or more and 80% or less with respect to the maximum groove depth of the shoulder main groove 21.

Additionally, as illustrated in FIG. 5, the shoulder block 312 has a plurality of sipes (reference sign omitted in drawings). Specifically, a single circumferential sipe is disposed in a region on the tire ground contact edge T side, the region being defined by the circumferential narrow groove 313, and extends in the tire circumferential direction, and both end portions thereof terminate within the shoulder block 312. Additionally, a plurality of sipes in the tire width direction are disposed in a region on the shoulder main groove 21 side, the region being defined by the circumferential narrow groove 313, and extend in the tire width direction, connecting the circumferential narrow groove 313 and the shoulder main groove 21 or the notch portion 314.

"Sipe" refers to a cut formed in a tread contact surface and has a sipe width of less than 1.5 mm and a sipe depth of 2.0 mm or more, so that the sipe closes when the tire comes into contact with the ground.

The sipe width is measured as the maximum opening width of the sipe on the tread contact surface when the tire is mounted on a specified rim, inflated to a specified internal pressure, and in an unloaded state.

The sipe depth is measured as a distance from the tread contact surface to a sipe bottom, when the tire is mounted on a specified rim, inflated to a specified internal pressure, and in an unloaded state. Additionally, in a configuration in which the sipe partially includes, in the sipe bottom, a raised bottom portion or a recess/protrusion portion, the sipe depth is measured excluding the portions.

Middle Land Portion

Figure 6:
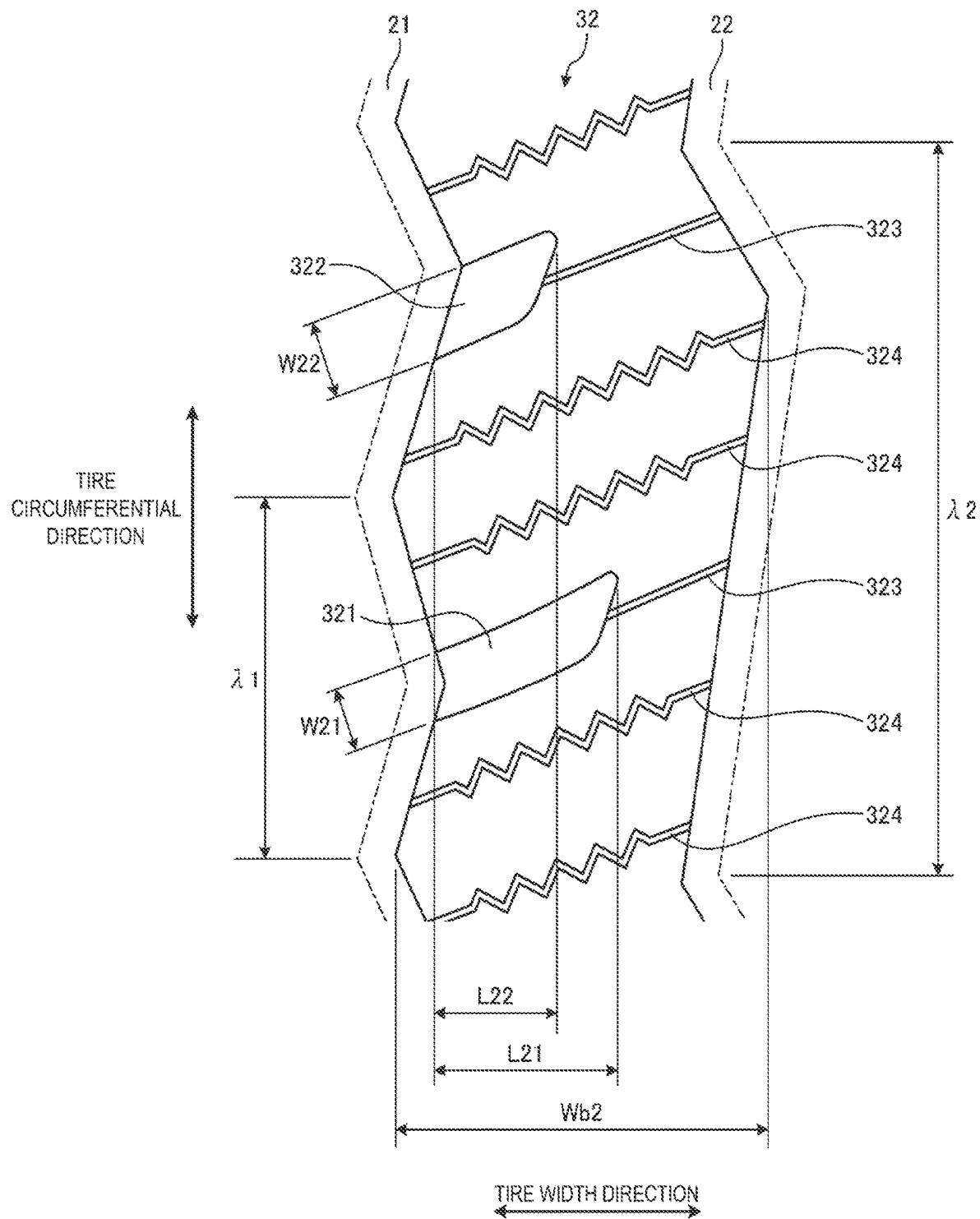
FIG. 6 is an enlarged view illustrating the middle land portion illustrated in FIG. 3.
Figure 7:
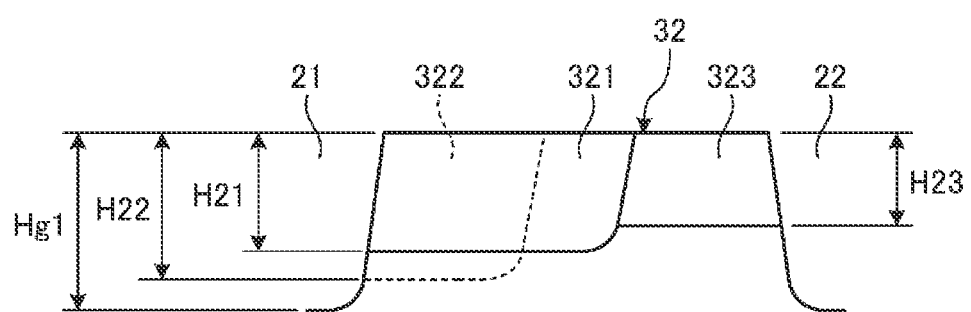
FIG. 7 is a cross-sectional view of the middle land portion illustrated in FIG. 6.

FIG. 6 is an enlarged view illustrating the middle land portion 32 illustrated in FIG. 3. The same drawing is an extracted view of a single middle land portion 32. FIG. 7 is a cross-sectional view of the middle land portion 32 illustrated in FIG. 6. The same drawing illustrates a cross-sectional view along a first middle lug groove 321.

As illustrated in FIG. 2 and FIG. 3, the middle land portion 32 includes the first middle lug groove 321 having a long length, and a second middle lug groove 322 having a short length.

The first and second middle lug grooves 321, 322 have a so-called semi-closed structure, and are each open to the shoulder main groove 21 at one end portion, and terminate in the middle land portion 32 at the other end portion. Also, all of the middle lug grooves 321, 322 are open to an edge portion of the middle land portion 32 on the tire ground contact edge T side, and not open to an edge portion on the tire equatorial plane CL side. Accordingly, the edge portion of the middle land portion 32 on the tire equatorial plane CL side has a plain structure that is not divided by lug grooves. Additionally, both the first and second middle lug grooves 321, 322 are each open to a maximum amplitude position, toward the tire equatorial plane CL, of the zigzag shape of the shoulder main groove 21. In other words, both the first and second middle lug grooves 321, 322 are open at positions in the edge portion of the middle land portion 32, the positions being recessed with respect to the shoulder main groove 21. Additionally the first middle lug grooves 321 and the second middle lug grooves 322 are arrayed at a predetermined interval in the tire circumferential direction.

In FIG. 6, a maximum length L21 of the first middle lug groove 321 in the tire width direction preferably has the relationship $1.30 \leq L21/L22 \leq 2.30$ with respect to a maximum length L22 of the second middle lug groove 322, and preferably has the relationship $1.40 \leq L21/L22 \leq 2.00$. Accordingly, opening areas of the first and second middle lug grooves 321, 322 are made uniform. The maximum length L21 of the first middle lug groove 321 has the relationship $L21/Wb2 \leq 0.60$ with respect to the maximum ground contact width Wb2 of the middle land portion 32. The maximum length L22 of the second middle lug groove 322 has the relationship $0.20 \leq L22/Wb2$ with respect to the maximum ground contact width Wb2 of the middle land portion 32. A lower limit of a ratio L21/Wb2 and an upper limit of a ratio L22/Wb2 are not particularly limited, but is subject to restrictions by the numerical ranges set forth above by the ratio L21/L22.

A maximum length of a lug groove is an extension length of a lug groove body, and is measured excluding a chamfered portion and a notch portion formed in the lug groove.

In the configuration described above, the first and second middle lug grooves 321, 322 have maximum groove lengths L21, L22 that differ from each other, and thus, compared to a configuration in which maximum groove lengths of the lug grooves are set to be uniform, the uneven wear resistance performance and snow traction performance of the tire can be efficiently provided in a compatible manner.

In the configuration of FIG. 6, the first middle lug groove 321 having a long length (L21>L22) faces the long portion of the zigzag shape of the center main groove 22, and the second middle lug groove 322 having a short length faces the short portion of the zigzag shape of the center main groove 22. Specifically, an extension line of a groove center line (not illustrated) of the first middle lug groove 321 intersects the long portion of the zigzag shape of the center main groove 22, and an extension line of a groove center line of the second lug groove 322 intersects the short portion of the zigzag shape of the center main groove 22.

Additionally, in the configuration of FIG. 6, groove widths of the first and second middle lug grooves 321, 322 each monotonically decrease from an opening portion to the shoulder main groove 21 toward a terminating end portion in the middle land portion 32. In addition, the terminating end portions of the first and second middle lug grooves 321, 322 have a V-shape formed by connecting first and second edge portions having a linear shape or an arc shape. The first and second middle lug grooves 321, 322 have a narrower groove width toward an identical direction in the tire circumferential direction (in FIG. 6, upper side of drawing).

The first and second middle lug grooves 321, 322 are inclined in an identical direction with respect to the tire circumferential direction. The first and second middle lug grooves 321, 322 and the long portion of the center main groove 22, the long portion having a zigzag shape, are inclined in an identical direction with respect to the tire circumferential direction. Also, an inclination angle (not illustrated) of the groove center line of each of the first and second middle lug grooves 321, 322 with respect to the tire circumferential direction is in the range of 45° or more and 90° or less.

In FIG. 6, a maximum groove width W22 of the second middle lug groove 322 having the short length preferably has the relationship $1.00 \leq W22/W21 \leq 1.50$ with respect to a maximum groove width W21 of the first middle lug groove 321 and more preferably has the relationship $1.05 \leq W22/W21 \leq 1.35$. Thus, the second middle lug groove 322 having the short length preferably has a wider structure than the first middle lug groove 321 having the long length. In such a configuration, groove volumes of the first and second middle lug grooves 321, 322 are made uniform. Accordingly, the rigidity of the middle land portion 32 in the tire circumferential direction is made uniform, and the uneven wear of the middle land portion 32 is suppressed.

Also, the maximum groove width W21 of the first middle lug groove 321 having the long length is in the range 5.0 mm≤W21, and the maximum groove width W22 of the second middle lug groove 322 is in the range of W22≤15 mm. An upper limit of the maximum groove width W21 and a lower limit of the maximum groove width W22 are not particularly limited, but is subject to restrictions by the numerical ranges set forth above by the ratio W22/W21.

In FIG. 7, a maximum groove depth H22 of the second middle lug groove 322 having the short length preferably has the relationship 1.20≤H22/H21≤1.60 with respect to a maximum groove depth H21 of the first middle lug groove 321 having the long length, and preferably has the relationship 1.30≤H22/H21≤1.50. In such a configuration, the second middle lug groove 322 having the short length is deeper than the first middle lug groove 321 having the long length, and thus the groove volumes of the first and second middle lug grooves 321, 322 are made uniform. Accordingly, the rigidity of the middle land portion 32 in the tire circumferential direction is made uniform, and the uneven wear of the middle land portion 32 is suppressed.

Further, in FIG. 7, the maximum groove depth H21 of the first middle lug groove 321 having the long length has the relationship 0.50≤H21/Hg1 with respect to a maximum groove depth Hg1 of the shoulder main groove 21, and the maximum groove depth H22 of the second middle lug groove 322 having the short length has the relationship of H22/Hg1≤0.95 with respect to the maximum groove depth Hg1 of the shoulder main groove 21. An upper limit of a ratio H21/Hg1 and a lower limit of a ratio H22/Hg1 are not particularly limited, but is subject to restrictions by the numerical ranges set forth above in the ratio H22/H21. Note that in FIG. 6, the middle lug grooves 321, 322 are shallower than the shoulder main groove 21, and thus a ridge line appears in a boundary portion between each of the middle lug grooves 321, 322 and the shoulder main groove 21 in a tread plan view.

As illustrated in FIG. 6, the middle land portion 32 includes a plurality of sipes 323, 324. Specifically, a first sipe 323 is open to the middle lug groove 321 or 322 at one end portion to extend the middle lug groove 321 or 322 and is open to the center main groove 22 at the other end portion. Additionally, the first sipe 323 has a straight shape and is inclined in an identical direction with respect to the first and second middle lug grooves 321, 322. The second sipe 324 is disposed between the first and second middle lug grooves 321, 322 adjacent to each other, and extends through the middle land portion 32 in the tire width direction to connect to the main grooves 21, 22 of left and right. Additionally, the second sipe 324 is inclined in an identical direction with respect to the first and second middle lug grooves 321, 322. The second sipe 324 has a zigzag shape and is inclined in an identical direction with respect to the first and second middle lug grooves 321, 322. Also, as illustrated in FIG. 7, a maximum depth H23 of the first sipe 323 that connects to the first and second middle lug grooves 321, 322 is shallower than the maximum groove depths H21, H22 of the first and second middle lug grooves 321, 322.

Additionally, as illustrated in FIG. 3, the edge portions of the middle land portion 32 each have a zigzag shape that is parallel with the groove center line of the shoulder main groove 21 or the center main groove 22. The middle land portion 32 is a rib that is continuous in the tire circumferential direction, and does not include a through lug groove that divides the middle land portion 32 in the tire width direction. This is a difference from the shoulder land portion 31, which is a block row. Note that the sipes 323, 324 are closed when the tire contacts the ground and do not inhibit a function of the land portion as a rib.

Center Land Portion

Figure 8:
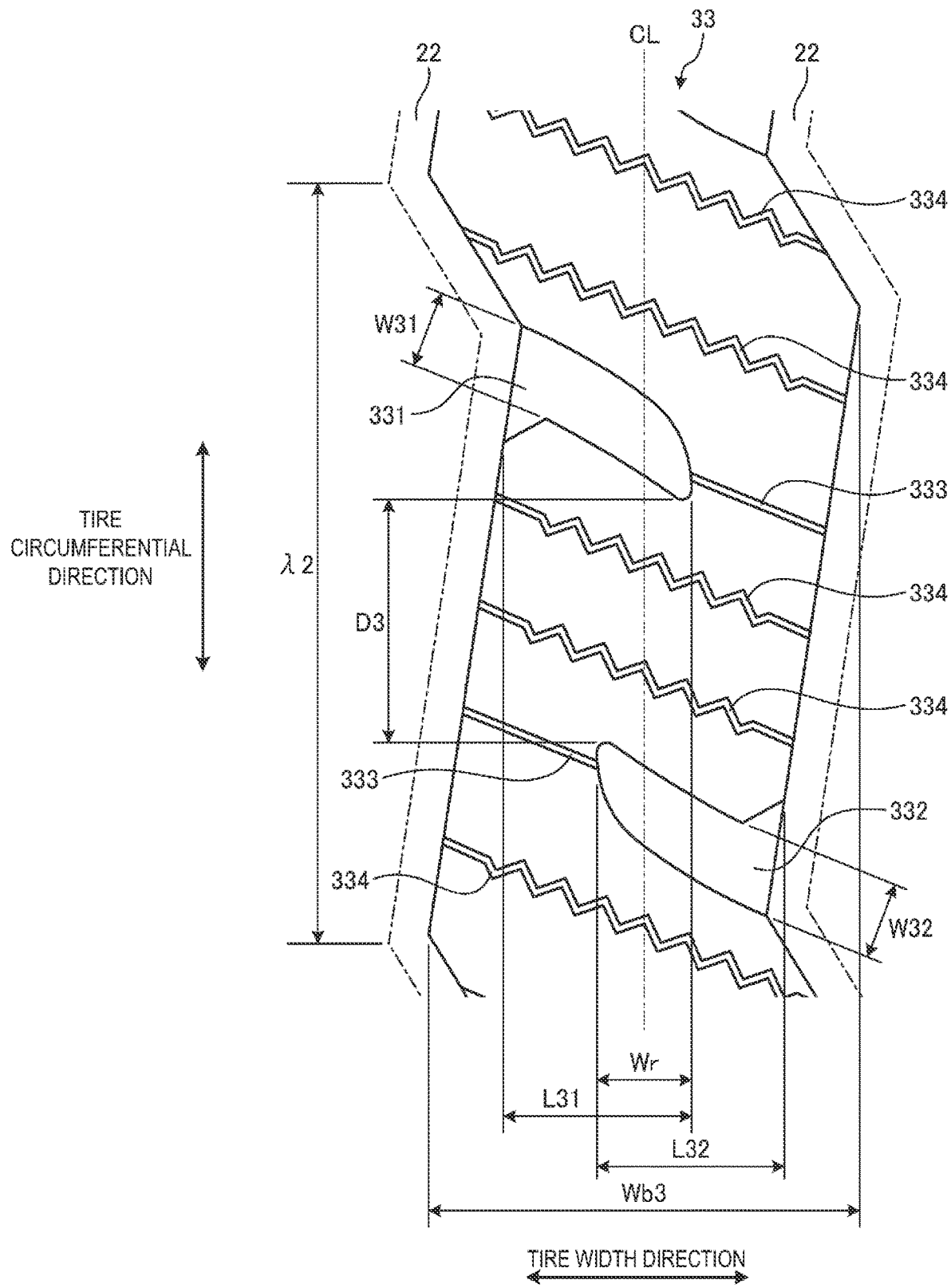
FIG. 8 is an enlarged view illustrating the center land portion illustrated in FIG. 4.
Figure 9:
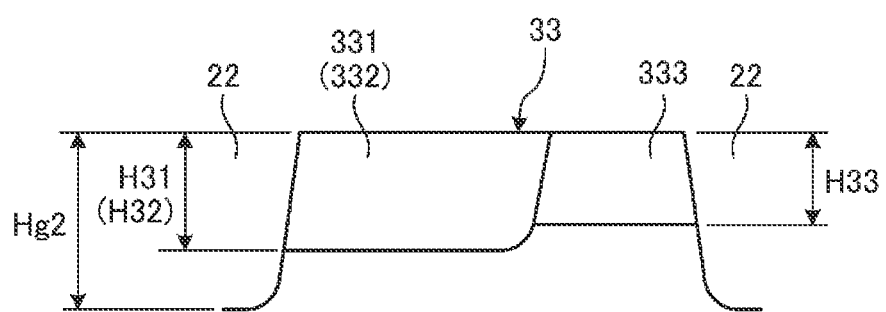
FIG. 9 is a cross-sectional view of the center land portion illustrated in FIG. 8.

FIG. 8 is an enlarged view illustrating the center land portion 33 illustrated in FIG. 4. The same drawing is an extracted view of a single center land portion 33. FIG. 9 is a cross-sectional view of the center land portion 33 illustrated in FIG. 8. The same drawing is a cross-sectional view along the center lug groove 331 (332).

As illustrated in FIG. 2 and FIG. 4, the center land portion 33 includes the first and second center lug grooves 331, 332.

The first and second center lug grooves 331, 332 have the so-called semi-closed structure, are open to the center main groove 22 at one end portion, and terminate at the other end portion in the center land portion 33. The first center lug groove 331 is formed in one edge portion of the center land portion 33, and the second center lug groove 332 is formed in the other edge portion of the center land portion 33. The first and second center lug grooves 331, 332 are each open to the maximum amplitude position, toward the tire equatorial plane CL, of the zigzag shape of the center main groove 22. In other words, the first and second center lug grooves 331, 332 are open at positions in the edge portion of the center land portion 33, the positions being recessed with respect to a corresponding one of the center main grooves 22, 22. As illustrated in FIG. 8, opening positions of the first and second center lug grooves 331, 332 are each preferably biased toward the side of the long portion of the zigzag shape of the center main grooves 22, 22. Additionally, the first and second center lug grooves 331, 332 are disposed alternately in a staggered manner in the tire circumferential direction.

In FIG. 8, maximum groove widths W31, W32 of the first and second center lug grooves 331, 332 are in the range of 5.0 mm or more and 10 mm or less. Additionally, the maximum groove widths W31, W32 of the first and second center lug grooves 331, 332 have the relationship 0.90≤W32/W31≤1.10, and preferably have the relationship 0.95≤W32/W31≤1.05. Thus, the first and second center lug grooves 331, 332 have a substantially identical maximum groove width.

Additionally, in FIG. 8, maximum lengths L31, L32 of the first and second center lug grooves 331, 332 in the tire width direction have the relationships 0.20≤L31/Wb3≤0.60 and 0.20≤L32/Wb3≤0.60 with respect to the maximum ground contact width Wb3 of the center land portion 33, and preferably have the relationships 0.35≤L31/Wb3≤0.45 and 0.35≤L32/Wb3≤0.45. The maximum lengths L31, L32 of the first and second center lug grooves 331, 332 preferably have the relationship 0.90≤L32/L31≤1.10, and more preferably have the relationship 0.95≤L32/L31≤1.05. Thus, the first and second center lug grooves 331, 332 have a substantially identical maximum groove length.

In FIG. 8, an overlap Wr of the center lug grooves 331, 332 adjacent to each other when viewed in the tire circumferential direction has the relationship 0≤Wr/Wb3≤0.30 with respect to the maximum ground contact width Wb3 of the center land portion 33, and preferably has the relationship 0.10≤Wr/Wb3≤0.25.

Additionally, in FIG. 8, a pitch number each of the first and second center lug grooves 331, 332 is equal to a pitch number of the zigzag shape of the center main groove 22. Thus, a pair of the center lug grooves 331, 332 are disposed within one pitch of the center main groove 22. Also, a distance D3 in the tire circumferential direction between the center lug grooves 331, 332 adjacent to each other has the relationship 0.20≤D3/λ2≤0.50 with respect to the wavelength λ2 of the zigzag shape in the center main groove 22.

In the configuration of FIG. 8, the first and second center lug grooves 331, 332 each face the long portion of the zigzag shape of the center main groove 22. Specifically, an extension line of a groove center line (not illustrated) each of the first and second center lug grooves 331, 332 intersects the long portion of the zigzag shape of the center main groove 22.

Additionally, in the configuration of FIG. 8, the groove widths of the first and second center lug grooves 331, 332 each monotonically decrease from the opening portion to the center main groove 22 toward the terminating end portion in the center land portion 33. The opening portion each of the first and second center lug grooves 331, 332 is widened by partially having a chamfered portion or a notch portion (reference sign omitted in drawings) on one side thereof. The terminating end portion each of the first and second center lug grooves 331, 332 has a V-shape formed by connecting first and second edge portions having a linear shape or an arc shape. Additionally, the pair of the first and second center lug grooves 331, 332 are each disposed on one long portion of the zigzag shape of the center main groove 22, and the center lug grooves 331, 332 have curved shapes in mutually opposite directions.

The first and second center lug grooves 331, 332 are inclined in an identical direction with respect to the tire circumferential direction. The first and second center lug grooves 331, 332 and the long portion of the zigzag shape of the center main groove 22 are inclined in mutually opposite directions with respect to the tire circumferential direction. Also, the inclination angle (not illustrated) of the groove center line of each of the first and second center lug grooves 331, 332 with respect to the tire circumferential direction is in the range of 45° or more and 90° or less.

In FIG. 9, maximum groove depths H31, H32 of the first and second center lug grooves 331, 332 have the relationships $0.70 \leq H31/Hg2 \leq 1.00$ and $0.70 \leq H32/Hg2 \leq 1.00$ with respect to a maximum groove depth Hg2 of the center main groove 22. Also, the maximum groove depths H31, H32 of the first and second center lug grooves 331, 332 preferably have the relationship $0.90 \leq H32/H31 \leq 1.10$. Thus, the first and second center lug grooves 331, 332 have a substantially identical maximum groove depth. Note that in the configuration of FIG. 8, the center lug grooves 331, 332 are shallower than the center main groove 22, and thus a ridge line appears in a boundary portion between each of the center lug grooves 331, 332 and the center main groove 22 in a tread plan view.

As illustrated in FIG. 8, the center land portion 33 includes a plurality of sipes 333, 334. Specifically, the first sipe 333 is open to the center lug groove 331 or 332 at one end portion to extend the center lug groove 331 or 332 and is open to the center main groove 22 at the other end portion. The first sipe 333 has a straight shape and is inclined in an identical direction with respect to the center lug grooves 331, 332. The second sipe 334 is disposed between the first and second center lug grooves 331, 332 adjacent to each other, and extends through the center land portion 33 in the tire width direction to connect to the center main grooves 22, 22 of left and right. The second sipe 334 is inclined in an identical direction with respect to the center lug grooves 331, 332. Also, the second sipe 334 has a zigzag shape and is inclined in an identical direction with respect to the center lug grooves 331, 332. As illustrated in FIG. 9, a maximum depth H33 of the first sipe 333 that connects to the center lug groove 331 or 332 is shallower than the maximum groove depths H31, H32 of the center lug grooves 331, 332, respectively.

Also, as illustrated in FIG. 4, edge portions of the center land portion 33 each have a zigzag shape that is parallel with the groove center line of the center main groove 22 of left and right. The center land portion 33 is a rib that is continuous in the tire circumferential direction, and does not include a through lug groove that divides the center land portion 33 in the tire width direction. This is a difference from the shoulder land portion 31, which is a block row. Note that the sipes are closed when the tire contacts the ground and thus do not inhibit a function of the land portion as a rib.

Effect

As described above, the pneumatic tire 1 includes the plurality of main grooves 21, 22 having the zigzag shape and extending in the tire circumferential direction, and the land portion 32 defined by the main grooves 21, 22 adjacent to each other, the land portion 32 having the rib structure that is continuous in the tire circumferential direction (see FIG. 2). The land portion 32 includes the first and second middle lug grooves 321, 322 having the semi-closed structure (see FIG. 3). Additionally, the maximum length L21 of the first middle lug groove 321 in the tire width direction preferably has the relationship $1.30 \leq L21/L22 \leq 2.30$ with respect to the maximum length L22 of the second middle lug groove 322.

In such a configuration (1) the land portion 32 is the rib that is continuous in the tire circumferential direction, and this has the advantage of ensuring the rigidity of the land portion 32 while ensuring the wear resistance performance and uneven wear resistance performance of the tire. Also, (2) the land portion 32 includes the middle lug grooves 321, 322 having the semi-closed structure, and this has the advantage of ensuring the snow traction performance of the tire. Further, (3) the first and second middle lug grooves 321, 322 have the maximum groove lengths L21, L22 that differ from each other, and thus, compared to a configuration in which the maximum groove lengths of the lug grooves are set to be uniform, the uneven wear resistance performance and snow traction performance of the tire can be efficiently provided in a compatible manner.

In the pneumatic tire 1 the maximum length L21 of the first middle lug groove 321 has the relationship $L21/Wb2 \leq 0.60$ with respect to the maximum ground contact width Wb2 of the land portion 32. The maximum length L22 of the second middle lug groove 322 has the relationship $0.20 \leq L22/Wb2$ with respect to the maximum ground contact width Wb2 of the land portion 32. This has the advantage of appropriately setting the maximum lengths L21, L22 of the first and second middle lug grooves 321, 322.

In the pneumatic tire 1, the first and second middle lug grooves 321, 322 are open to the edge portion of the land portion 32 on the tire ground contact edge T side (see FIG. 2). This has the advantage of ensuring the rigidity of the edge portion of the land portion 32 on the tire equatorial plane CL side and ensuring the uneven wear resistance performance of the tire.

Additionally, in the pneumatic tire 1 both the first and second middle lug grooves 321, 322 each open to the maximum amplitude position, toward the tire equatorial plane CL, of the zigzag shape of the main groove 21 (see FIG. 3).

Such a configuration has the advantage of increasing the maximum ground contact width Wb2 of the land portions 32 and effectively suppressing the uneven wear of the land portion 32, compared to a configuration in which the lug grooves open to a maximum amplitude position, toward the tire ground contact edge, of the zigzag shape of the main groove.

In the pneumatic tire 1 the maximum groove width W22 of the second middle lug groove 322 has the relationship $1.05 \leq W22/W21 \leq 1.50$ with respect to the maximum groove width W21 of the first middle lug groove 321 (see FIG. 6). In such a configuration, the maximum groove width W22 of the second middle lug groove 322 having the short length is wider than the maximum groove width W21 of the first middle lug groove 321 having the long length, and thus the groove volumes of the first and second middle lug grooves 321, 322 are made uniform. This has the advantage of making the rigidity of the land portion 32 in the tire circumferential direction uniform and suppressing the uneven wear of the land portion 32.

Also, in the pneumatic tire 1, the maximum groove width W21 of the first middle lug groove 321 is in the range $4.0$ mm $\leq W21$, and the maximum groove width W22 of the second middle lug groove 322 is in the range of $W22 \leq 15$ mm (See FIG. 6). This has the advantage of appropriately setting the maximum groove widths W21, W22 of the first and second middle lug grooves 321, 322.

Further, in the pneumatic tire 1 the maximum groove depth H22 of the second middle lug groove 322 has the relationship $1.20 \leq H22/H21 \leq 1.60$ with respect to the maximum groove depth H21 of the first middle lug groove 321.

In such a configuration the maximum groove depth H22 of the second middle lug groove 322 having the short length is larger than the maximum groove depth H21 of the first middle lug groove 321 having the long length, and thus the groove volumes of the first and second middle lug grooves 321, 322 are made uniform. This has the advantage of making the rigidity of the land portion 32 in the tire circumferential direction uniform and suppressing the uneven wear of the land portion 32.

In the pneumatic tire 1, the maximum groove depth H21 of the first middle lug groove 321 has the relationship $0.50 \leq H21/Hg1$ with respect to the maximum groove depth Hg1 of the main groove 21, and the maximum groove depth H22 of the second middle lug groove 322 has the relationship $H22/Hg1 \leq 0.95$ with respect to the maximum groove depth Hg1 of the main groove 21. This has the advantage of appropriately setting the maximum groove depths H21, H22 of the first and second middle lug grooves 321, 322.

Further, in the pneumatic tire 1, of the main grooves 21, 22 defining the land portion 32, the main groove 21 on the tire ground contact edge T side has the zigzag shape formed by connecting the linear portions having the approximately identical length, and the circumferential length Lg1 of the linear portion has the relationship $0.30 \leq Lg1/\lambda1 \leq 0.70$ with respect to the wavelength $\lambda1$ of the zigzag shape (see FIG. 3). Additionally, the main groove 22 on the tire equatorial plane CL side has the zigzag shape formed by connecting the long portions and the short portions, and the circumferential length Lg2 of the long portion has the relationship $0.70 \leq Lg2/\lambda2 \leq 0.90$ with respect to the wavelength $\lambda2$ of the zigzag shape. Such a configuration has the advantage of improving the traction characteristics of the tread portion shoulder region and effectively enhancing the snow performance of the tire. On the other hand, the rigidity of an edge portion of the land portion 32 on the tire equatorial plane CL side is ensured, and the center wear of the land portion 32 is suppressed. This has the advantage of providing the snow performance and uneven wear resistance performance of the tire in a compatible manner.

Also, in the pneumatic tire 1 the wavelengths $\lambda1$, $\lambda2$ of the zigzag shapes of the main grooves 21, 22, respectively, have the relationship $1.50 \leq \lambda2/\lambda1 \leq 2.00$ (see FIG. 3). The lower limit described above provides the advantage of ensuring reinforcement of the rigidity of the edge portion of the land portion 32 on the tire equatorial plane CL side due to the longer wavelength $\lambda2$. The upper limit described above provides the advantage of alleviating a difference in rigidity between the edge portions of left and right of the land portion 32.

Further, in the pneumatic tire 1, the first and second middle lug grooves 321, 322 are open to the edge portion of the land portion 32 on the tire ground contact edge T side, and the first middle lug groove 321 is disposed opposite the long portion of the main groove 22 on the tire equatorial plane CL side (see FIG. 3). Such a configuration enhances the rigidity of the edge portion of the land portion 32 on the tire equatorial plane CL side, compared to a configuration in which the first middle lug groove 321 having the long length is disposed opposite the short portion of the main groove 22 on the tire equatorial plane CL side. This has the advantage of suppressing the center wear of the land portion 32.

Additionally, in the pneumatic tire 1, the first and second middle lug grooves 321, 322 are open to the edge portion of the land portion 32 on the tire ground contact edge T side, and the inclination direction of the first middle lug groove 321 with respect to the tire circumferential direction is the same as the inclination direction of the long portion of the main groove 22 on the tire equatorial plane CL side (see FIG. 3). Such a configuration enhances the rigidity of the edge portion of the land portion 32 on the tire equatorial plane CL side, compared to a configuration in which the inclination direction of the first middle lug groove 321 having the long length is opposite to the inclination direction of the long portion of the main groove 22 on the tire equatorial plane CL side, This has the advantage of suppressing the center wear of the land portion 32.

Additionally, in the pneumatic tire 1 the main groove 21 on the tire ground contact edge T side is the shoulder main groove on an outermost side in the tire width direction (see FIG. 2). This has the advantage of effectively exhibiting the effects described above of the main grooves 21, 22 of left and right, the main grooves defining the land portion 21.

Further, the pneumatic tire 1 includes the shoulder land portion 31 defined by the shoulder main grooves 21 (see FIG. 2). Further, the shoulder land portion 21 includes the plurality of the lug grooves 311 extending through the shoulder land portion 31 and a plurality of the blocks 312 defined by the lug grooves 311. This has the advantage of enhancing the snow traction properties of the tread portion shoulder region.

Additionally, the pneumatic tire 1 is a heavy duty tire mounted on a drive shaft of a vehicle. By application to such a heavy duty tire, there is an advantage that a significant effect of improving the snow traction performance and uneven wear resistance performance of the tire can be obtained.

EXAMPLES

FIG. 10 and FIG. 11 are tables showing the results of performance tests of pneumatic tires according to embodiments of the technology.

In the performance tests, a plurality of types of test tires were evaluated in terms of (1) snow traction performance and (2) uneven wear resistance performance. Test tires having a tire size of 11R22.5 are assembled on rims specified by JATMA, and an internal pressure specified by JATMA and a load specified by JATMA are applied to the test tires.

Additionally, the test tires were each mounted on a drive shaft of a tractor head of a 2-D (two-wheel vehicle), which is a test vehicle.

(1) For evaluation of snow traction performance, the test vehicle is driven on a snowy road surface of a snowy road test site and the acceleration time until the travel speed reaches 20 km/h from 5 km/h is measured. The measurement results are expressed as index values and evaluated with Conventional Example being assigned as the reference (100). In this evaluation, larger values are preferable.

(2) In the evaluation of uneven wear resistance performance, the test vehicle runs 30000 km on a predetermined paved road, and then degrees of heel and toe wear are measured and expressed as index values and evaluated. Results of the evaluation are expressed as index values and evaluated with the Conventional Example being assigned as the reference (100). In this evaluation, larger values are preferable.

The test tires of Examples are provided with the configurations of FIG. 1 and FIG. 2, and include four main grooves 21, 22 having a zigzag shape and five rows of land portions 31 to 33 defined by the main grooves 21, 22. Also, the maximum groove widths Wg1, Wg2 of the main grooves 21, 22, respectively, are each 9.0 mm, and the maximum groove depths Hg1, Hg2 of the main grooves 21, 22, respectively, are each 21 mm. The wavelength $\lambda 1$ of the zigzag shape of the shoulder main groove 21 is 40 mm, and the length Lg1 of the linear portion that is the long portion is 25 mm. A ratio of the maximum ground contact width Wb2 of the middle land portion 32 and the maximum ground contact width Wb3 of the center land portion 33 with respect to the tire ground contact width TW is 20%. The tire ground contact width TW is 240 mm.

The test tire of Conventional Example includes, in the configuration of FIG. 1 and FIG. 2, main grooves 21, 22 that have a straight shape.

As can be seen from the test results, the test tires of the Examples provide both snow traction performance and uneven wear resistance performance in a compatible manner.

The invention claimed is:

1. A pneumatic tire comprising:
a plurality of main grooves having a zigzag shape and extending in a tire circumferential direction; and,
a land portion defined by the main grooves adjacent to each other, the land portion having a rib structure that is continuous in the tire circumferential direction,
the land portion comprising first and second lug grooves having a semi-closed structure,
a maximum length L21 of the first lug groove in a tire width direction having a relationship $1.30 \leq L21/L22 \leq 2.30$ with respect to a maximum length L22 of the second lug groove,
the first and second lug grooves being open to an edge portion of the land portion on a tire ground contact edge side; and
an edge portion of the land portion on the tire equatorial plane side having a plain structure that is not divided by lug grooves; wherein
of the main grooves defining the land portion, the main groove on a tire ground contact edge side has a zigzag shape formed by alternately connecting linear portions having an approximately identical length,
a circumferential length Lg1 of the linear portion has a relationship $0.30 \leq Lg1/\lambda 1 \leq 0.70$ with respect to a wavelength $\lambda 1$ of the zigzag shape,
the main groove on a tire equatorial plane side has a zigzag shape formed by alternately connecting long portions and short portions,
a circumferential length Lg2 of the long portion has a relationship $0.70 \leq Lg2/\lambda 2 < 0.90$ with respect to a wavelength $\lambda 2$ of the zigzag shape; and
the first lug groove is disposed opposite the long portion of the main groove on the tire equatorial plane side.

2. A pneumatic tire according to claim 1, wherein
the maximum length L21 of the first lug groove has a relationship $L21/Wb2 \leq 0.60$ with respect to a maximum ground contact width Wb2 of the land portion, and
the maximum length L22 of the second lug groove has a relationship $0.20 \leq L22/Wb2$ with respect to the maximum ground contact width Wb2 of the land portion.

3. A pneumatic tire according to claim 1, wherein the first and second lug grooves are open to a maximum amplitude position, toward a tire equatorial plane, of the zigzag shape of the main groove.

4. A pneumatic tire according to claim 1, wherein the wavelengths $\lambda 1$, $\lambda 2$ of the zigzag shapes of the main groove have a relationship $1.50 \leq \lambda 2/\lambda 1 \leq 2.00$.

5. A pneumatic tire according to claim 1, wherein
the first lug groove has an inclination direction with respect to the tire circumferential direction, the inclination direction being identical with respect to an inclination direction of the long portion of the main groove on the tire equatorial plane side.

6. A pneumatic tire according to claim 1, wherein the main groove on the tire ground contact edge side is a shoulder main groove on an outermost side in the tire width direction.

7. A pneumatic tire according to claim 1, wherein
the pneumatic tire comprises a shoulder land portion defined by the shoulder main groove,
the shoulder land portion further comprises a plurality of lug grooves extending through the shoulder land portion and a plurality of blocks defined by the lug grooves.

8. A pneumatic tire according to claim 1, wherein
the pneumatic tire is a heavy duty tire mounted on a drive shaft of a vehicle.

9. A pneumatic tire according to claim 1, wherein a maximum groove width W22 of the second lug groove has a relationship $1.05 \leq W22/W21 \leq 1.50$ with respect to a maximum groove width W21 of the first lug groove.

10. A pneumatic tire according to claim 9, wherein
the maximum groove width W21 of the first lug groove is in a range of $4.0 \text{ mm} \leq W21$, and
the maximum groove width W22 of the second lug groove is in a range of $W22 \leq 15$ mm.

11. A pneumatic tire according to claim 1, wherein a maximum groove depth H22 of the second lug groove has a relationship $1.20 \leq H22/H21 \leq 1.60$ with respect to a maximum groove depth H21 of the first lug groove.

12. A pneumatic tire according to claim 11, wherein
the maximum groove depth H21 of the first lug groove has a relationship $0.50 \leq H21/Hg1$ with respect to a maximum groove depth Hg1 of the main groove, and
the maximum groove depth H22 of the second lug groove has a relationship $H22/Hg1 \leq 0.95$ with respect to the maximum groove depth Hg1 of the main groove.

13. A pneumatic tire comprising:
a plurality of main grooves having a zigzag shape and extending in a tire circumferential direction; and,
a land portion defined by the main grooves adjacent to each other, the land portion having a rib structure that is continuous in the tire circumferential direction, the land portion comprising first and second lug grooves having a semi-closed structure, a maximum length L21 of the first lug groove in a tire width direction having a relationship $1.30 \leq L21/L22 \leq 2.30$ with respect to a maximum length L22 of the second lug groove, and a maximum groove depth H22 of the second lug groove having a relationship $1.20 \leq H22/H21 \leq 1.60$ with respect to a maximum groove depth H21 of the first lug groove.

14. A pneumatic tire comprising:

a plurality of main grooves having a zigzag shape and extending in a tire circumferential direction; and, a land portion defined by the main grooves adjacent to each other, the land portion having a rib structure that is continuous in the tire circumferential direction, the land portion comprising first and second lug grooves having a semi-closed structure, a maximum length L21 of the first lug groove in a tire width direction having a relationship $1.30 \leq L21/L22 \leq 2.30$ with respect to a maximum length L22 of the second lug groove, of the main grooves defining the land portion, the main groove on a tire ground contact edge side having a zigzag shape with a wavelength $\lambda 1$ formed by alternately connecting linear portions having an approximately identical length, the main groove on a tire equatorial plane side having a zigzag shape with a wavelength $\lambda 2$ formed by alternately connecting long portions and short portions, and the wavelengths $\lambda 1$, $\lambda 2$ having a relationship $1.50 \leq \lambda 2/\lambda 1 \leq 2.00$.

15. A pneumatic tire comprising:

a plurality of main grooves having a zigzag shape and extending in a tire circumferential direction; and, a land portion defined by the main grooves adjacent to each other, the land portion having a rib structure that is continuous in the tire circumferential direction, the land portion comprising first and second lug grooves having a semi-closed structure, a maximum length L21 of the first lug groove in a tire width direction having a relationship $1.30 \leq L21/L22 \leq 2.30$ with respect to a maximum length L22 of the second lug groove, the first and second lug grooves being open to an edge portion of the land portion on a tire ground contact edge side; and an edge portion of the land portion on the tire equatorial plane side having a plain structure that is not divided by lug grooves; wherein of the main grooves defining the land portion, the main groove on a tire ground contact edge side has a zigzag shape formed by alternately connecting linear portions having an approximately identical length, a circumferential length Lg1 of the linear portion has a relationship $0.30 \leq Lg1/\lambda 1 \leq 0.70$ with respect to a wavelength $\lambda 1$ of the zigzag shape, the main groove on a tire equatorial plane side has a zigzag shape formed by alternately connecting long portions and short portions, a circumferential length Lg2 of the long portion has a relationship $0.70 \leq Lg2/\lambda 2 \leq 0.90$ with respect to a wavelength $\lambda 2$ of the zigzag shape; and the first lug groove has an inclination direction with respect to the tire circumferential direction, the inclination direction being identical with respect to an inclination direction of the long portion of the main groove on the tire equatorial plane side.

* * * * *